Oct. 20, 1953          A. VAN RYAN          2,656,490
SERIES CAPACITOR PROTECTIVE DEVICE AND SYSTEM
Filed March 30, 1950
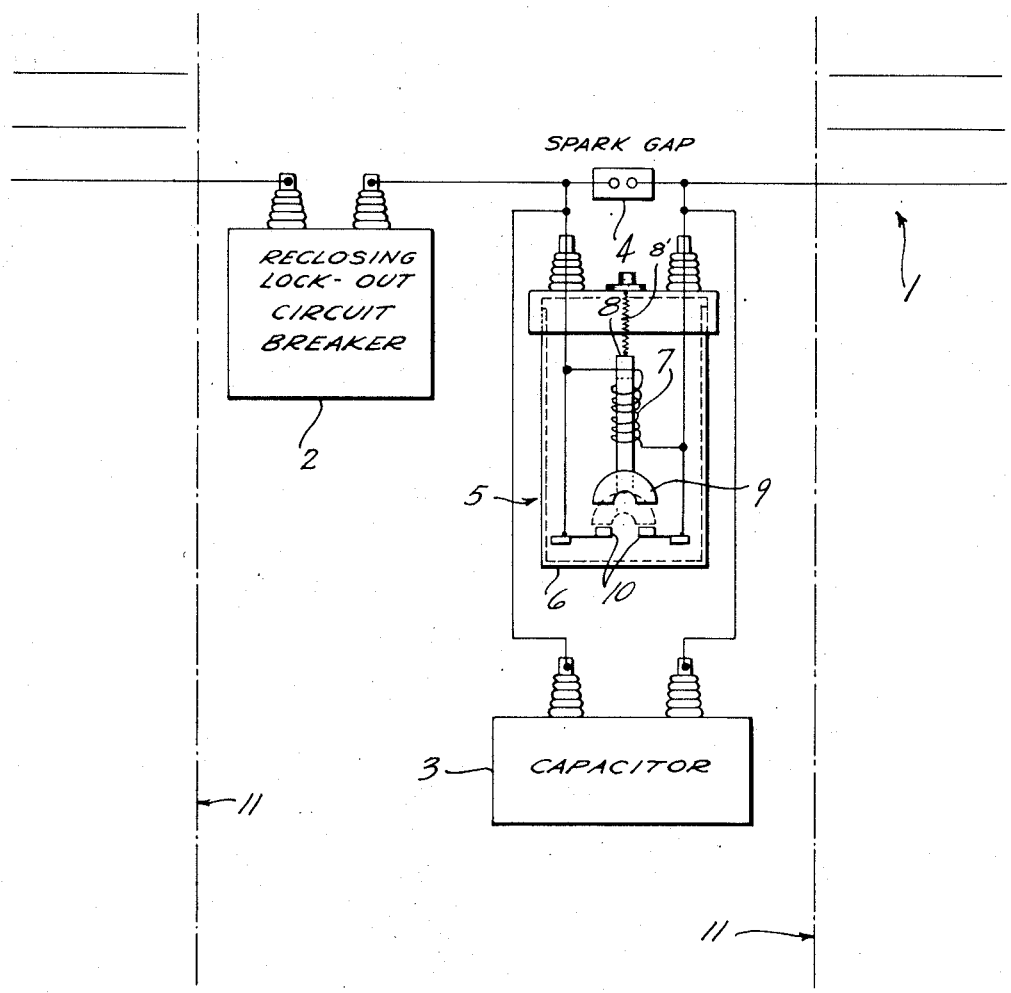
INVENTOR.
Anthony Van Ryan
BY
Attorney

Patented Oct. 20, 1953

2,656,490

UNITED STATES PATENT OFFICE 2,656,490

SERIES CAPACITOR PROTECTIVE DEVICE
AND SYSTEM

Anthony Van Ryan, South Milwaukee, Wis., assignor to McGraw Electric Co., Milwaukee, Wis., a corporation of Delaware Application March 30, 1950, Serial No. 152,801

4 Claims. (Cl. 317—12)

This invention relates to a series capacitor protective device and to a system in which series capacitors are employed and coact with other elements of the system to protect the series capacitors in the event of abnormal condition.

Up to the present time, series capacitors have not been widely used because of the difficulty and great expense of protecting them from excessive currents upon occurrence of faults and from over-voltage due to surges. However, it is desirable to use series capacitors for voltage correction in distribution lines as they can be cheaply constructed and do not have to withstand the full line voltage under ordinary operating conditions.

This invention is designed to provide a system of voltage correction which employs series capacitors and which provides for the protection of the series capacitors in the event of a surge, fault, or other abnormal condition.

Specific objects of this invention are to provide a series capacitor protective device which is so constructed that it coacts with a repeating, lock-out circuit interrupter, and which is so made that it will restore itself to its normal condition when the power line is again under normal conditions.

A further object of this invention is to provide a construction which is very simple and may be easily installed in a polyphase or single phase power line, for instance, with a minimum of change and which provides maximum protection for the series capacitor.

An embodiment of the invention is shown in the accompanying drawings, in which:

The single figure is a diagrammatic view showing the device applied to one phase or line of a polyphase system, the remaining devices being similar but being omitted for the sake of simplicity.

Referring to the drawings, it will be seen that a polyphase line has been indicated by the reference character 1. In each phase of this line a repeating lock-out circuit breaker 2 is installed, one only having been shown in the diagram. The series capacitor is indicated by the reference character 3 and is bridged by means of a spark gap 4 which has a relatively low break-down voltage as compared with that of the normal voltage between phases. It has a break-down voltage somewhat below the safe working voltage of the series capacitor 3, so that it is thus arranged to spark-over and provide a by-pass whenever a voltage is produced between the terminals of the series capacitor above the break-down voltage of the spark gap.

In conjunction with the spark gap, an automatic, magnetically operated, by-passing protective device 5 is employed. This device may comprise a casing 6 within which is mounted an actuating or energizing coil 7 which normally holds a magnetic plunger 8 in an elevated position during current flow. This coil 7 is connected in parallel with the spark gap 4 and the series capacitor 3. The plunger 8 carries or actuates a movable contact 9 which is arranged to bridge stationary contacts 10 when it drops down. However, the plunger 8 and movable contact 9 are spring supported by means of a spring 8', and are arranged so that the movable contact 9 is held just out of contact with the stationary contacts 10 in a neutral position even when the coil 7 is deenergized, as shown in dotted lines. The stationary contacts 10 are preferably somewhat resilient or resiliently mounted and are connected across the series capacitor 3 and the spark gap 4. When the coil 7 is energized, the plunger 8 and movable contact 9 are held in an elevated position as shown in full lines. When the coil 7 is suddenly deenergized, the plunger 8 and movable contact 9 will suddenly drop down and the movable contact 9 will momentarily engage the stationary contacts 10 and bridge the spark gap 4.

The spring 8' alone will hold the movable contact 9 slightly out of engagement with the stationary contacts 10 as shown in dotted lines. Current flow through the line will cause a further elevation of the contact 9 and plunger 8, and a current flow equivalent to the minimum trip current of the reclosing lock-out circuit breaker will cause a maximum elevation of the plunger 8 and contact 9. A further increase in current flow through the capacitor will cause a potential to appear across its terminals sufficient to cause flash-over of the spark gap 4. Also any potential surges on the line equal to or in excess of this voltage will cause a flash-over of the spark gap 4. The spark gap provides a shunt or by-pass around the coil 7 which, when the gap sparks over, will cause the plunger 8 and movable contact 9 to drop downwardly past the dotted line position due to the inertia of said plunger 8 and movable contact 9 and thereby temporarily bridge the stationary contacts 10, thus shorting out the spark gap and thereby extinguishing the spark at the spark gap. The movable contact 9 is returned to the position shown in the dotted lines, or to any position corresponding to the current flowing through the coil.

If the condition causing the aforementioned action is temporary, the plunger 8 and contact 9 will return to switch open position. However, in the event of a permanent fault, the movable contact 9 will repeatedly engage stationary contacts 10 until the repeating lock-out, circuit breaker will finally lock out.

It is to be distinctly understood that between the imaginary lines 11, 11, a plurality of these units as hereinabove described are provided, one set for each power line. For the sake of simplicity, however, only one set of units has been illustrated.

It will be seen that a very simple type of series capacitor with protective means therefor has been provided. Further, it will be seen that the series capacitors may be installed for voltage correction in distribution systems with assurance of full protection for the capacitors.

It is obvious that either individual reclosing lock-out circuit breakers indicated by the reference character 2, or a polyphase, lock-out circuit breaker, may be used without departing from the spirit of this invention. It is to be understood that the circuit breaker 2, which may be called a back-up circuit breaker, must be coordinated with the capacitor in such a way that its minimum trip current will be equal to the maximum current that the capacitor can continuously carry without producing a destructive potential across the capacitor.

The tank 6 may be oil or gas filled and the specific mechanical construction of the device may be varied as required, provided, however, that the switch means is normally held open under no load and under load conditions and is arranged to close temporarily under abnormal conditions as described.

It will be seen that the device is relatively simple and that it will provide adequate protection for a series capacitor.

It is to be understood that no attempt has been made to show details of the specific manner in which the protective device 5 or the spark gap 4 is constructed. It is to be understood, however, that all of the live parts are insulated from other portions of the apparatus.

It will be seen further that the electromagnetically controlled switch means is responsive to the voltage across the capacitor. Further it will be seen that such electromagnetically controlled switch means is, in itself, controlled by the spark gap, for so long as the spark gap is intact, the switch means remains open, but as soon as the spark gap breaks down, the switch means temporarily closes and extinguishes the spark.

Although this invention has been described in considerable detail, it is to be understood that such description is intended as illustrative rather than limiting, as the invention may be variously embodied and is to be interpreted as claimed.

I claim:

1. In an electrical distribution system, a power line, a capacitor connected in series with said line, electromagnetic means bridged across said capacitor, normally open switch means controlled by said electromagnetic means and connected across said capacitor, and a spark gap in parallel with said electromagnetic means and arranged to break down at a predetermined voltage, said normally opened switch means being held open by said electromagnetic means when said electromagnetic means is energized, said switch means being arranged to close when said spark gap breaks down and said electromagnetic means is deenergized.

2. In an electrical distribution system, a power line, a capacitor connected in series with said line, electromagnetic means including an energizing coil bridged across said capacitor and an armature, switch means connected to said armature and held open when said coil is energized, said switch means being connected across said capacitor, a spark gap connected in parallel with said coil and capacitor and arranged to break down at a predetermined voltage, said switch means including movable contact means and stationary contact means and a spring normally holding said movable contact means in a neutral position spaced from said stationary contact means, said electromagnetic means acting in the same direction as said spring means and urging said movable contact means beyond said neutral position away from said stationary contact means when energized and when deenergized allowing said movable contact means to move towards and past said neutral position to temporarily close said switch means, said switch means being thereafter moved to open position by said spring means.

3. In an electrical distribution system, a power line, a capacitor connected in series with said line, electromagnetic means including an energizing coil bridged across said capacitor and an armature, switch means connected to said armature and held open when said coil is energized, said switch means being connected across said capacitor, a spark gap connected in parallel with said coil and capacitor and arranged to break down at a predetermined voltage, spring means normally holding said switch means slightly open and said electromagnetic means when energized acting in the same direction as said spring means, said switch means being arranged to temporarily close and thereafter move to open position when said electromagnetic means is deenergized upon breaking down of said spark gap, and a reclosing lock-out circuit breaker connected in series with said capacitor.

4. In a device of the class described, a capacitor, protective means therefor comprising a spark gap electrically connected to said capacitor and arranged to have the voltage across said capacitor imposed on said spark gap, said spark gap being characterized by the fact that it has a predetermined break-down voltage, normally open switch means bridging said spark gap and arranged to temporarily close when released, and normally energized electromagnetic means shunting said spark gap and holding said switch means open and arranged to release said switch means when said spark gap breaks down, said switch means having spring means for moving said switch means to open position after it has temporarily closed.

ANTHONY VAN RYAN.

References Cited in the file of this patent

UNITED STATES PATENTS

| Number | Name | Date |
|---|---|---|
| 2,230,726 | Owens | Feb. 4, 1941 |
| 2,298,068 | Pierce | Oct. 6, 1942 |
| 2,323,702 | Berkey | July 6, 1943 |
| 2,399,367 | Marbury | Apr. 30, 1946 |
| 2,401,009 | Marbury | May 28, 1946 |
| 2,569,133 | Podolsky | Sept. 25, 1951 |

FOREIGN PATENTS

| Number | Country | Date |
|---|---|---|
| 213,121 | Switzerland | Apr. 16, 1941 |